(12) United States Patent
Dawson et al.

(10) Patent No.: US 10,126,906 B2
(45) Date of Patent: Nov. 13, 2018

(54) OPTIMIZING A USER INTERFACE FOR A COMPUTING DEVICE

(71) Applicant: International Business Machines Corporation, Armonk, NY (US)

(72) Inventors: Christopher J. Dawson, Arlington, VA (US); Vincenzo V. Diluoffo, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 14/520,383

(22) Filed: Oct. 22, 2014

(65) Prior Publication Data
US 2015/0040045 A1 Feb. 5, 2015

Related U.S. Application Data

(63) Continuation of application No. 12/952,491, filed on Nov. 23, 2010, now Pat. No. 8,924,873.

(51) Int. Cl.
*G06F 3/0481* (2013.01)
*G06F 3/0482* (2013.01)
*G06F 3/0483* (2013.01)
*G06F 3/0484* (2013.01)
*G06F 9/451* (2018.01)

(52) U.S. Cl.
CPC .......... *G06F 3/0481* (2013.01); *G06F 3/0484* (2013.01); *G06F 3/04847* (2013.01); *G06F 9/451* (2018.02)

(58) Field of Classification Search
CPC .... G06F 9/4443; G06F 3/0481; G06F 3/0482; G06F 3/0483; H04N 5/44591
See application file for complete search history.

(56) References Cited

U.S. PATENT DOCUMENTS 5,525,978 A * 6/1996 York ................ G06F 3/0238
341/22
5,991,735 A 11/1999 Gerace
(Continued)

FOREIGN PATENT DOCUMENTS

CN 1991834 A 7/2007
EP 0367709 A1 5/1990
(Continued)

OTHER PUBLICATIONS

U.S. Appl. No. 12/952,491, Office Action, dated Jan. 31, 2013, 20 pages.
(Continued)

*Primary Examiner* — Kevin L Young
*Assistant Examiner* — Erik V Stitt
(74) *Attorney, Agent, or Firm* — William H. Hartwell; Maxine L. Barasch; Keohane & D'Alessandro PLLC

(57) ABSTRACT

In general, embodiments of the invention provide an approach to organize a user interface, such as a computer desktop, based on the role or activity of the current user. Specifically, a display area configuration of a user device is defined by selecting resources from a plurality of available resources to include in a display area configuration, building a profile from the selected resources to preserve the display area configuration, and saving the profile. The display area is then built on a user device when the profile is selected from the user device.

14 Claims, 5 Drawing Sheets

(56) References Cited

U.S. PATENT DOCUMENTS

| | | | |
|---|---|---|---|
| 6,324,546 B1 | 11/2001 | Ka et al. | |
| 6,785,822 B1* | 8/2004 | Sadhwani-Tully | G06F 21/6281 713/1 |
| 6,874,019 B2 | 3/2005 | Hamilton, II et al. | |
| 6,922,843 B1 | 7/2005 | Herrington et al. | |
| 7,117,448 B2 | 10/2006 | Cooper et al. | |
| 7,139,972 B2 | 11/2006 | Hamilton, II et al. | |
| 7,222,369 B2 | 5/2007 | Vering et al. | |
| 7,237,240 B1 | 6/2007 | Chen et al. | |
| 7,275,150 B2 | 9/2007 | Pagan | |
| 7,523,486 B1 | 4/2009 | Turner | |
| 7,543,244 B2 | 6/2009 | Matthews et al. | |
| 7,590,972 B2 | 9/2009 | Axelrod et al. | |
| 7,653,688 B2 | 1/2010 | Bittner | |
| 7,653,930 B2 | 1/2010 | Griffin et al. | |
| 8,112,715 B2 | 2/2012 | Cragun et al. | |
| 8,214,398 B1* | 7/2012 | Cowan | G06F 21/6218 707/785 |
| 8,284,078 B2* | 10/2012 | Lin | G06F 3/023 341/22 |
| 8,387,117 B2 | 2/2013 | Eom et al. | |
| 8,387,137 B2* | 2/2013 | Lee | H04L 63/0823 713/156 |
| 8,527,876 B2* | 9/2013 | Wood | G06F 3/048 375/354 |
| 8,626,141 B2 | 1/2014 | Davies-Moore et al. | |
| 8,856,833 B2* | 10/2014 | Conness | H04N 5/44543 725/45 |
| 8,924,873 B2 | 12/2014 | Dawson et al. | |
| 9,043,826 B1 | 5/2015 | Patil et al. | |
| 9,247,012 B2 | 1/2016 | Dheap et al. | |
| 9,313,046 B2 | 4/2016 | Appelman et al. | |
| 2003/0107591 A1 | 6/2003 | Jameson | |
| 2004/0098594 A1* | 5/2004 | Fleming | G06F 21/604 713/182 |
| 2005/0010877 A1 | 1/2005 | Udler | |
| 2005/0028191 A1 | 2/2005 | Sullivan et al. | |
| 2006/0047657 A1 | 3/2006 | Frieder et al. | |
| 2006/0214917 A1* | 9/2006 | Liu | G06F 3/0238 345/172 |
| 2006/0282790 A1 | 12/2006 | Matthews et al. | |
| 2007/0156693 A1 | 7/2007 | Soin et al. | |
| 2008/0098307 A1* | 4/2008 | Corbefin | G06F 3/14 715/733 |
| 2008/0209338 A1* | 8/2008 | Li | G06F 17/30867 715/745 |
| 2008/0301562 A1* | 12/2008 | Berger | G06F 17/3089 715/733 |
| 2009/0025063 A1 | 1/2009 | Thomas | |
| 2009/0049389 A1* | 2/2009 | Kuzmanovic | G06F 9/4443 715/745 |
| 2009/0100322 A1 | 4/2009 | Phillips et al. | |
| 2009/0307038 A1 | 12/2009 | Chakra et al. | |
| 2010/0037158 A1 | 2/2010 | Commarford et al. | |
| 2010/0064077 A1* | 3/2010 | Chung | G06F 3/023 710/67 |
| 2010/0161587 A1* | 6/2010 | Sullivan | G06F 17/30884 707/709 |
| 2010/0169828 A1 | 7/2010 | Kho et al. | |
| 2010/0231515 A1* | 9/2010 | Ng | G06F 3/0219 345/163 |
| 2012/0084286 A1 | 4/2012 | Hubner et al. | |
| 2012/0131482 A1 | 5/2012 | Dawson et al. | |
| 2013/0097523 A1* | 4/2013 | Kimball | G06F 3/0481 715/745 |
| 2013/0326413 A1* | 12/2013 | Croft | G06F 3/0481 715/811 |
| 2015/0040046 A1 | 2/2015 | Dawson et al. | |
| 2015/0215398 A1* | 7/2015 | Chang | H04L 67/1095 726/8 |
| 2016/0088117 A1* | 3/2016 | Cao | G06F 12/121 709/213 |

FOREIGN PATENT DOCUMENTS

| | | | |
|---|---|---|---|
| EP | 0747810 A2 | | 12/1996 |
| EP | 20090014373 | * | 11/2009 |
| EP | 2216705 A1 | | 8/2010 |
| WO | 2005022357 A2 | | 3/2005 |

OTHER PUBLICATIONS

U.S. Appl. No. 12/952,491, Office Action, dated Mar. 26, 2013, 10 pages.
U.S. Appl. No. 12/952,491, Office Action, dated Sep. 26, 2013, 14 pages.
U.S. Appl. No. 12/952,491, Office Action, dated May 12, 2014, 16 pages.
U.S. Appl. No. 12/952,491, Notice of Allowance, dated Aug. 21, 2014, 13 pages.
Xiao Qi Zhi, "Information Materials for IDS", CN Office Action Dated Jun. 18, 2015, 4 pages.
Stitt, Erik V., U.S. Appl. No. 14/520,397, Office Action, dated Apr. 3, 2017, 23 pgs.
Stitt, Erik, U.S. Appl. No. 14/520,397, Office Action, dated Nov. 29, 2016, 46 pages.
Stitt, Erik V., U.S. Appl. No. 14/520,397, Office Action, dated Jul. 5, 2017, 19 pgs.
Stitt, Erik V., U.S. Appl. No. 14/520,397, Final Office Action, dated Nov. 7, 2017, 30 pgs.
Stitt, Erik V., U.S. Appl. No. 14/520,397, Office Action, dated May 10, 2018, 23 pgs.

* cited by examiner

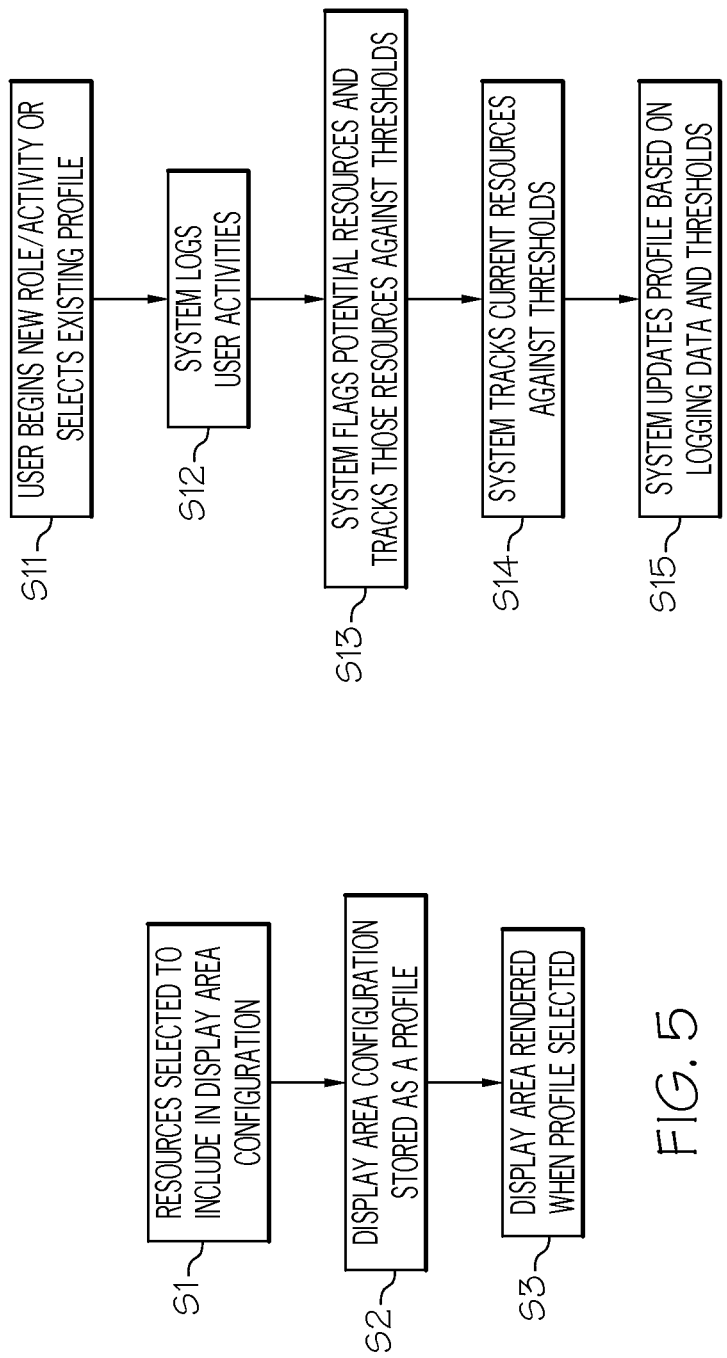

OPTIMIZING A USER INTERFACE FOR A COMPUTING DEVICE

CROSS-REFERENCE TO RELATED APPLICATIONS

The present patent document is a continuation of U.S. patent application Ser. No. 12/952,491, filed Nov. 23, 2010, entitled "OPTIMIZING A USER INTERFACE FOR A COMPUTING DEVICE", the disclosure of which is incorporated herein by reference.

TECHNICAL FIELD

The present invention relates to optimizing a user interface (e.g., display area) of a computing device. Specifically, the present invention provides a system and method to organize a display area of a computing device, such as a computer desktop, based on the role or activity of the current user.

BACKGROUND

Computers affect our lives in many ways. Among other things, they allow users to communicate with others, access music and videos, edit photos, and access information quickly on any given subject. In a business setting, computers have dramatically decreased the amount of time necessary to perform many work-related tasks. However, due to the many tasks performed and the various roles assumed by a computer user, it is easy for a desktop to become cluttered, making it difficult to find specific items and reducing efficiency.

Solutions exist today which give users the ability to log in as a specific user on a computer system to perform tasks in which the applications, services, and files are arranged according to the role that the user performs. However, in these cases, there is no easy method for the computer system to automatically configure the desktop environment to display only the information that is relevant for the role or activity that the user is currently performing.

SUMMARY

In general, embodiments of the invention provide an approach to optimizing a user interface on a computing device. Specifically, a display area configuration of a user device is defined by the selection of a set of files, applications, etc., which are associated with a specific role or activity of the user. The defined configuration is stored as a profile. The user can then switch to the defined configuration by selecting the stored profile when performing the role or task. A computer desktop is used as one example embodiment of the present invention. The use of this example is not intended to be limiting, as any user device having a display area may be used with the systems and methods described herein.

In one embodiment, there is a method for defining a display area configuration of a user device. In this embodiment, the method comprises: defining a display area configuration of a user device, comprising: receiving one or more user selections of resources from a plurality of available resources to include in a display area configuration; building a profile from the selected resources to preserve the display area configuration; saving the profile; and building the display area on a user device when the profile is selected from the user device.

In a second embodiment, there is a system for defining a display area configuration of a user device. In this embodiment, the system comprises: at least one processing unit and memory operably associated with the at least one processing unit. A display area configuration tool is storable in memory and executable by the at least one processing unit. The display area configuration tool comprises a user input component configured to receive one or more user inputs when selecting resources from a plurality of available resources to include in a display area configuration; a preserving component configured to build a profile from the selected resources to preserve the display area configuration and save the profile; and a rendering component to build the display area on a user device when the profile is selected from the user device.

In a third embodiment, there is a computer-readable medium storing computer instructions which, when executed, enables a computer system to define a display area configuration of a user device, the computer readable medium comprising: program code for causing a computer system to: receive one or more user selections of resources from a plurality of available resources to include in a display area configuration; build a profile from the selected resources to preserve the display area configuration; save the profile; and build the display area on a user device when the profile is selected from the user device.

In a fourth embodiment, there exists a method for deploying a system for defining a display area configuration of a user device. In this embodiment, a computer infrastructure is provided and is operable to: receive one or more user selections of resources from a plurality of available resources to include in a display area configuration; build a profile from the selected resources to preserve the display area configuration; save the profile; and build the display area on a user device when the profile is selected from the user device.

BRIEF DESCRIPTION OF THE DRAWINGS

These and other features of this invention will be more readily understood from the following detailed description of the various aspects of the invention taken in conjunction with the accompanying drawings in which:

FIG. 5 shows a method flow diagram of a process for manually defining a display area configuration.

FIG. 6 shows a method flow diagram of a process for dynamically defining a display area configuration.

Figure 1:
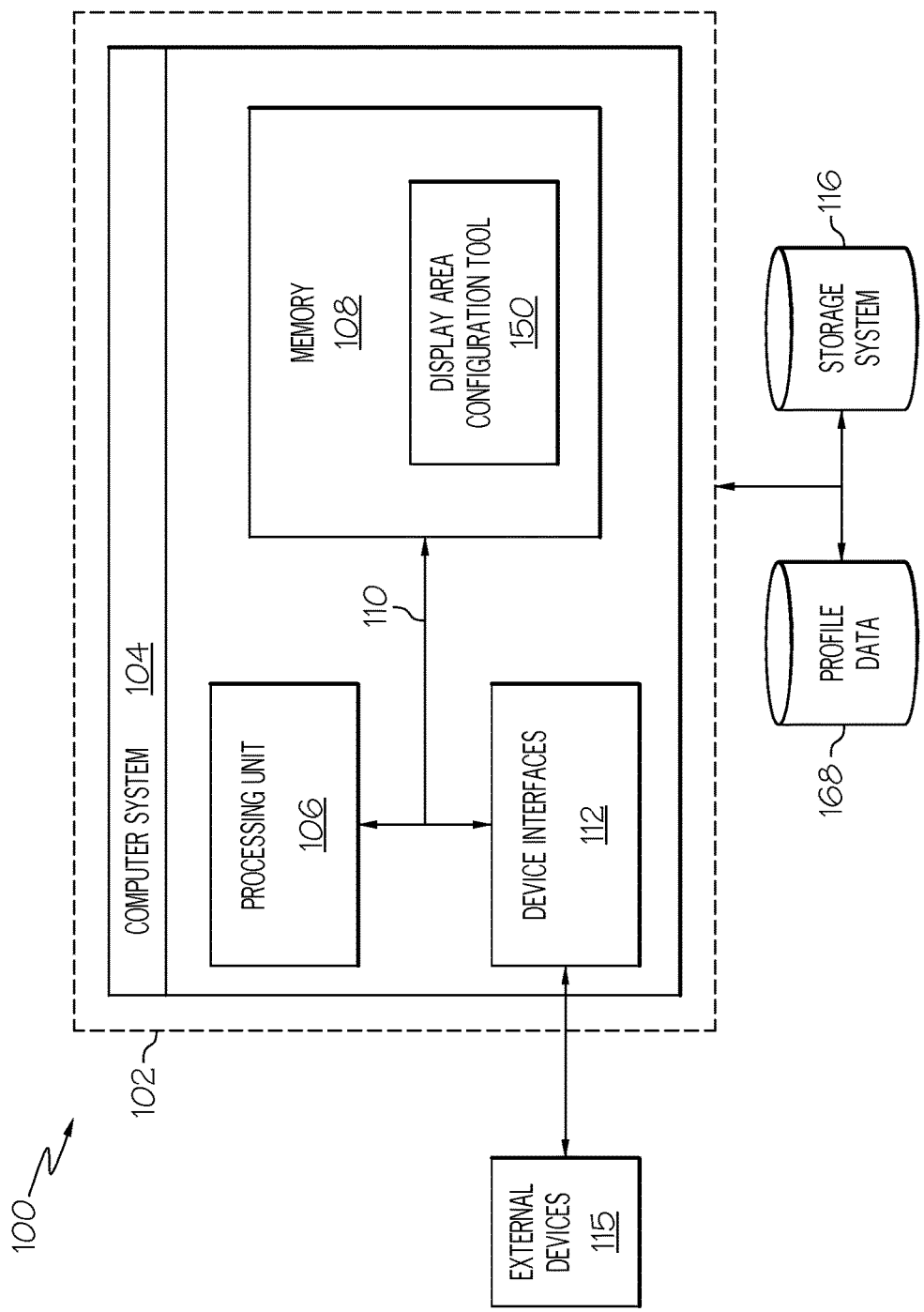
FIG. 1 illustrates a computerized implementation 100 of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a display area configuration tool 150, a bus 110, and device interfaces 112.

Processing unit 106 collects and routes signals representing outputs from external devices 115 (e.g., a keyboard, a pointing device, a display, a graphical user interface, etc.) to display area configuration tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating display area configuration tool 150, which is stored in memory 108 and/or storage system 116. While executing computer program code, processing unit 106 can read and/or write data to/from memory 108, storage system 116, and profile data 168. Storage system 116 and profile data 168 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Computer desktops become cluttered; many times with unused icons and shortcuts. Computers are capable of performing such a vast array of tasks that they can become filled with a host of applications and data. These conditions make it difficult for a user to find specific resources needed to perform a given role or activity. The present invention creates a desktop experience that is more efficient by making it easier to located applications, services, files, and other information required to perform the role or activity. Resources that may be included in the display area configuration include, but are not limited to, files, folder and directory structures, contacts in an address book, email messages, applications, cloud services, etc.

In one embodiment of the present invention, the user manually defines a display area configuration associated with a specific role or activity. The profiles are stored in a database or other storage device associated with the computer. Example roles include customer, parent, or employee. Activities may include such things as work, hobby, or managing a budget. The examples cited above are illustrative only and not intended to be limiting. Multiple display area configurations may be defined by a user, with each configuration being associated with a specific role or activity. Each defined display area configuration is stored as a profile. As used herein, a 'profile' is a file(s) representing the mapping for a specific display area configuration which is stored in a database or other data storage area.

Figure 2:
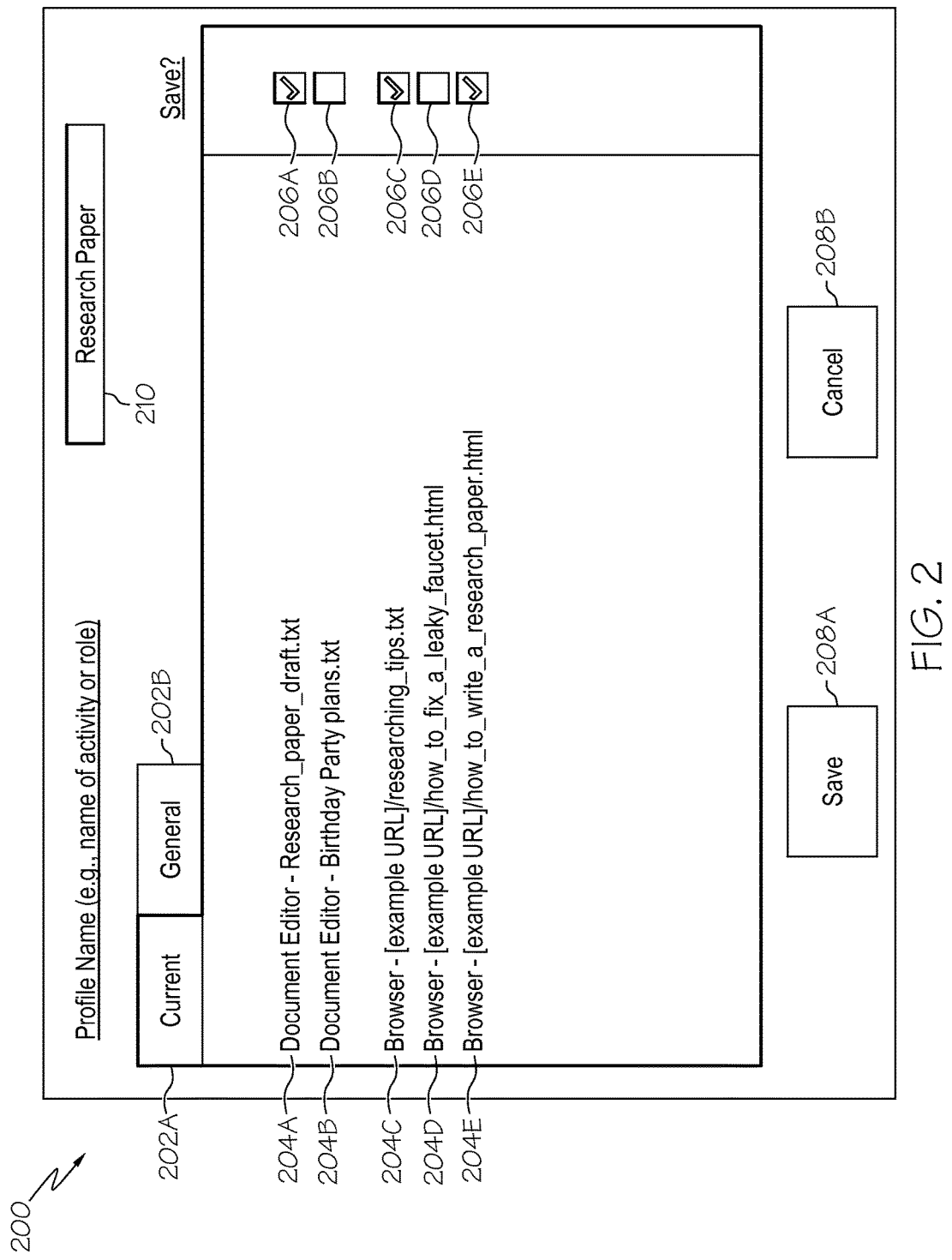
FIG. 2 illustrates one example of a graphical user interface (GUI), which allows a user to manually select from resources currently open to include in a display area configuration.

Referring now to FIG. 2, one example of a graphical user interface (GUI) is shown which allows a user to manually select from resources which are currently open on the user device to include in a display area configuration. A GUI 200 listing available content is shown. When the user desires to select from resources that have already been opened by the user, Current tab 202A is selected, rather than General tab 202B. An object can be associated with one or more display area configuration profiles. Two text documents (204A, 204B) and three internet browser pages (204C-204E) are listed as resources available in GUI 200. Checkboxes 206A-206E are displayed to the right of the interface. In computing, a checkbox is a graphical user interface element that permits the user to make multiple selections from a number of options. Save button 208A and cancel button 208B are at the bottom of the screen. As shown in FIG. 2, particular resources to include in a display area configuration associated with a specific role or activity (i.e., 'Research Paper') have been selected by a user. The display area configuration is stored as a profile using the value entered in profile name 202.

Figure 3:
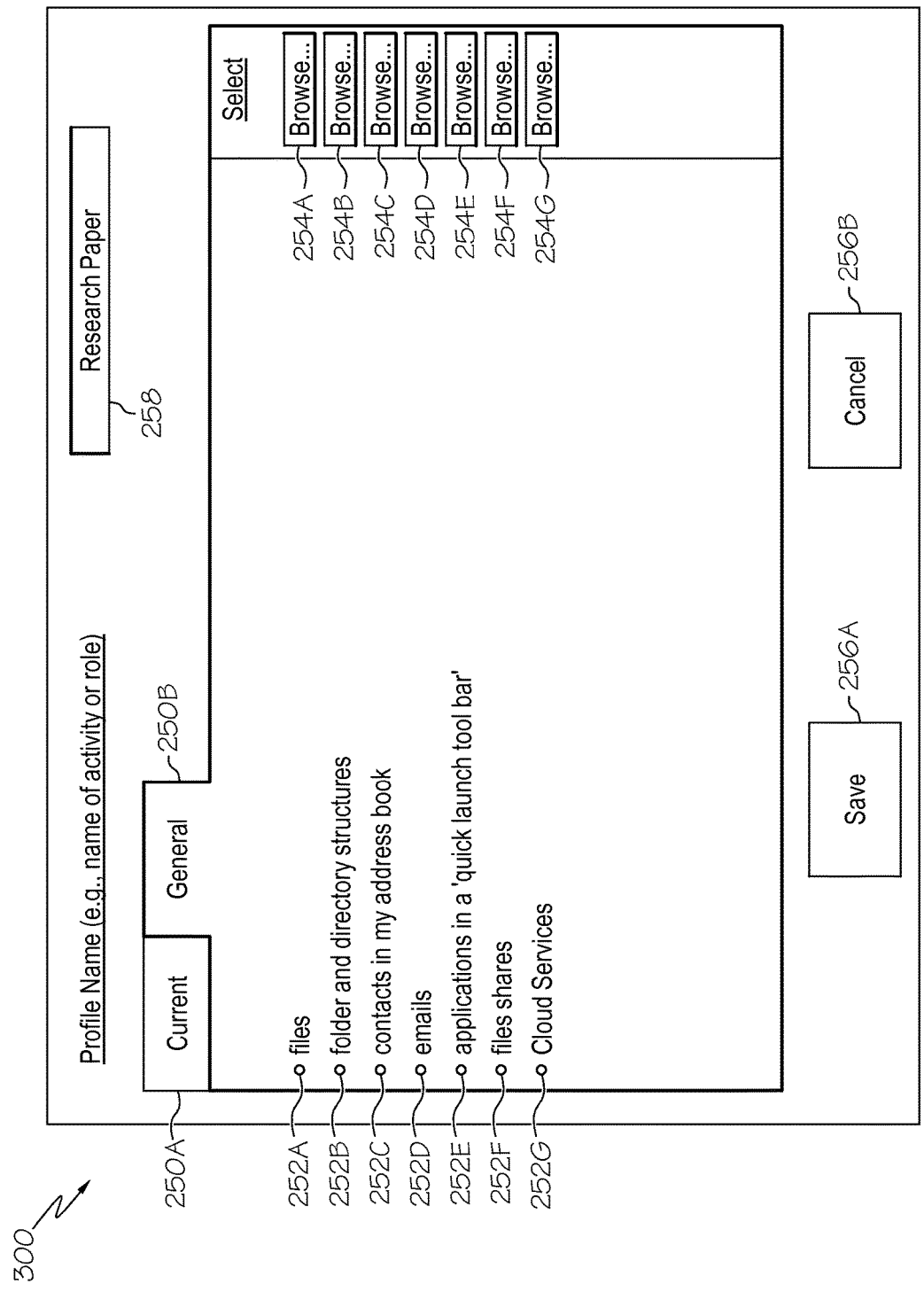
FIG. 3 illustrates one example of a graphical user interface (GUI), which allows a user to manually select from resources not currently open to include in a display area configuration.

Referring now to FIG. 3, one example of a graphical user interface (GUI) is shown which allows a user to manually select resources not currently open to include in a display area configuration. A GUI 300 listing resource types (252A-252G) is shown with a browse button for each type (254A-254G). One or more browse buttons may be used to locate and select resources that are not currently open. As noted in the figure, General tab 250B is selected, rather than Current tab 250A when performing this operation. Profile name 258 is shown at the top of the screen. Save button 256A and cancel button 256B are at the bottom of the screen.

For example, a user wishes to add a file to the display area configuration, but the file is not currently open. One option is to select General tab 250B. User selects browse button 254A to browse for the file. After the file is found and selected, user clicks Save button 256A. The selected file is added to the display area configuration.

In another embodiment of the present invention, an approach for dynamically defining a display area configuration is presented. From an automated standpoint, events that determine what the user is currently accessing to perform a specific task or role must be captured. Such events may include, but are not limited to, key strokes, applications accessed, data accessed, and systems logs. The profile is built and updated as the system gathers data on which resources to include and/or discard based on user activities.

In another embodiment, a hybrid approach which utilizes both the manual configuration and automated configuration methods for defining a display area configuration is presented. Using this approach, the user manually defines the display area configuration by selecting the desktop resources to be included. The display area configuration is stored as a profile. The user then selects to have the user activities monitored when using the profile. Resources are added and/or subtracted, and the profile is updated, based on user activities.

In still another embodiment, the credentials of the user are limited based on the role or activity that is being performed. This reduces the need for unnecessary credentials. For example, when working on a spreadsheet, the user does not need access to a customer relationship management or CRM system which helps a company keep track of and easily access information about its customers or clients. Therefore, the credentials are disabled.

Not only will this limit access of the specific role, but it can be used to ensure that two applications may not be open at the same time for two different roles. For example, this is especially useful when acting as an administrator for two customer computer systems. Role 'A' allows access to customer A's data, whereas Role 'B' allows access to customer B's data. The present invention allows for the separation of roles, so that a user cannot be associated with more than one role at any one time. This would prevent the user from accessing both sets of customer data at the same time.

Figure 4:
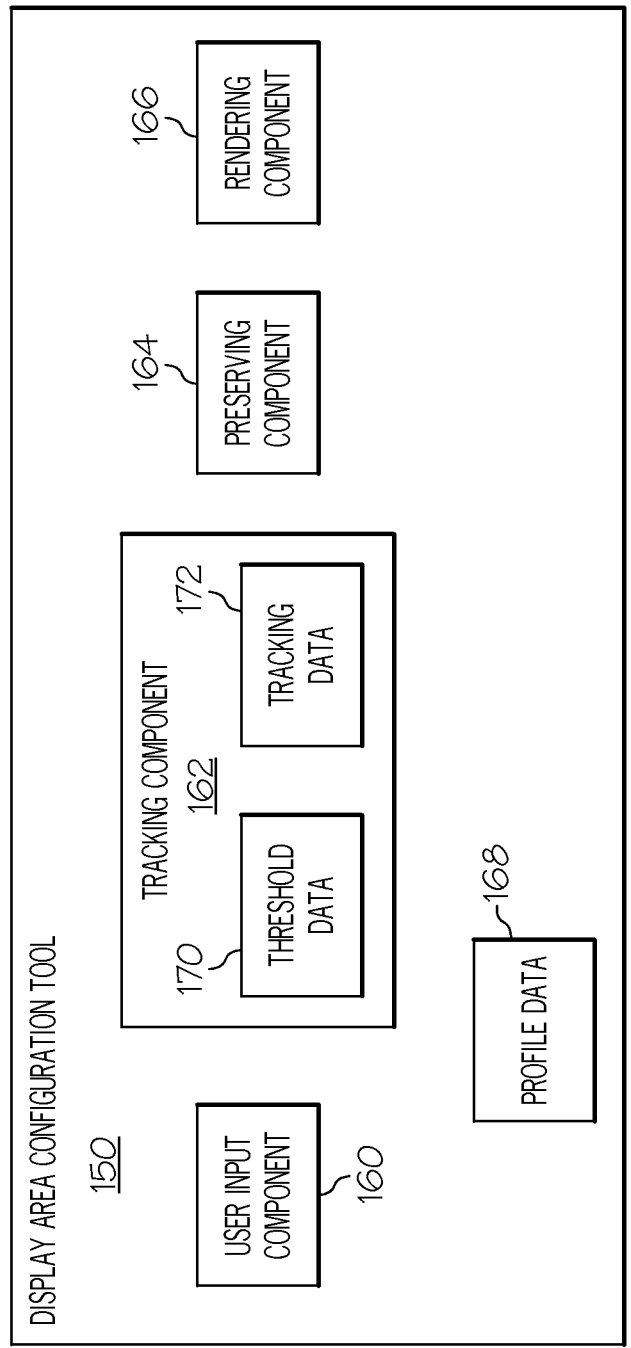
FIG. 4 depicts a display area configuration tool according to one embodiment of this invention.

FIG. 4 shows a more detailed view of one example display area configuration tool 150 shown in FIG. 1. Display area configuration tool 150 comprises user input component 160, tracking component 162, preserving component 164 and rendering component 166. Information relating to each profile is stored in profile data 168. Tracking component 162 utilizes threshold data 170 and resource tracking data 172 to store data for configuration automation. The process will be described by way of example using the hybrid method of both manual configuration and automated configuration in defining a display area configuration for user activity that user has named 'Research Paper'.

Display area configuration tool 150 includes a user input component that receives one or more user inputs selecting desktop content from a plurality of resources displayed on a user interface to include in a display area configuration. Referring back to FIG. 2, user input component receives user selections to checkboxes 206A, 206C, and 206E. User input component also receives the user click to save button 208A. The two items not selected (204B, 204D) are unrelated to writing a research paper and are not included in the defined display area configuration. Preserving component 162 gathers information relating to selected desktop content, builds a display area configuration profile using the gathered information to preserve the define display area configuration, and stores the profile.

The user decides to have the profile updated dynamically by utilizing the automated configuration option. The user selects the profile set up for activity 'Research Paper'. Tracking component 162 begins to monitor the activities of the user (e.g., applications accessed, files accessed, contacts used, etc.). When the user accesses a new resource, it is flagged as a potential candidate to be included in the profile. Resource tracking data is stored in resource tracking data 172.

For each resource that was accessed directly, it is given a weighted value (e.g., a value of '5'). If the resource was a file in a folder (or an application within a suite of applications), then the other items in the folder (or applications in the suite) are given a lower weighted value (e.g., a value of '1'). The system checks all the resources having a weighted value and determines when each was last accessed. If the resource was not accessed within the last predefined number of days, then the weighted value is decremented.

The system then optimizes the desktop based on the resources and the weighted values of each. For example, files and applications having a zero weighted value (or other minimum threshold value) may be grayed out or removed from the desktop. Applications reaching weighted value threshold may be added to the desktop, task bar, or web browser favorites, etc. The weighted values thresholds and the amount of time required before decrementing a value may be customized and tailored for optimization, and are stored in threshold data 170. Tracking component 162 uses data gathered in resource tracking data 172 which impacts the display area configuration in some way (adding a resource, removing a resource, graying out a resource, etc.) to update profile data 168 for the given profile.

Rendering component 164 presents the display area configuration on a user device when the profile is selected from the user device. Rendering component reads profile data 168 for the profile selected. Using the data read from profile data 168 for the profile selected by the user, the desktop or display device is configured.

In one embodiment, the user can switch to a different saved profile when moving to a new a role or activity. For example, a user may need to perform some work-related tasks in the morning and pay bills in the afternoon. The user switches to a 'Pay Bills' profile which has been set up and saved at an earlier time. In one embodiment, the user can switch to a different profile by using a click step (e.g., the control key plus 'F2') or piece of hardware (e.g., the scroll wheel on a computer mouse) to perform the profile switch. In another embodiment, the user may link a profile to a calendar, so that the user is switched to a role associated with a customer meeting (e.g., 'Customer' profile). The examples above for switching profiles are exemplary only and not intended to be limiting. Other options for switching profiles are possible within the scope of the invention.

Referring now to FIG. 5, a display area configuration process flow 400 for manually defining a display area configuration will be described in further detail. As shown, the user defines a display area configuration by selecting resources to include in the display area configuration (step S1). The resources may include a set of documents, applications, and other items that represent the resources needed when working on a specific role or activity. The display area configuration is stored as a profile (S2). When the profile is selected on the user device, the predefined display area configuration is rendered (S3).

Referring now to FIG. 6, a display area configuration process flow 400 for dynamically defining a display area configuration will be described in further detail. As shown, the user creates a new user device configuration relating to a specific role or activity, or selects an existing profile, to be automatically configured (S11). The system monitors or logs activities of the user (S12). Any new resource (file, application, etc.) that the user accesses is flagged as a potential candidate to be included in the display area configuration and the system begins tracking the resource (S13). The system also logs resources that are currently included in the display area configuration (S14). Resources are added or removed to the display area configuration based on pre-defined thresholds and user activities, and updates the profile (S15).

It will be appreciated that the method process flow 500 of FIG. 5 represents one possible implementation of a process flow for manually defining a display area configuration, and that other process flows are possible within the scope of the invention. It will be further appreciated that method process flow 600 of FIG. 6 represents one possible implementation of a process flow for dynamically defining a display area configuration, and that other process flows are possible within the scope of the invention. Method process flow 500 and method process flow 600 illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the methodologies disclosed herein can be used within a computer system to define a display area configuration. In this case, display area configuration tool 150 can be provided, and one or more systems for performing the processes described in the invention can be obtained and deployed to computer infrastructure 102. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The example computer system 104 may be described in the general context of computer-executable instructions, such as program modules, being executed by a computer. Generally, program modules include routines, programs, people, components, logic, data structures, and so on, that perform particular tasks or implements particular abstract data types. The example computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of the example computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for defining a display area configuration. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for defining a display area configuration of a user device, comprising:

assigning a user a plurality of roles, wherein the user is only able to access one of the plurality of roles at a time;

associating a first set of resources, from a plurality of available resources, with a first role of the plurality of roles for inclusion in a first display area configuration;

associating a second set of resources from a plurality of available resources, with the second role of the plurality of roles for inclusion in a second display area configuration;

building a first profile from the first set of resources;

building a second profile from the second set of resources, wherein the second profile is in a same application as the first profile;
saving the first profile and the second profile;
building a first display area on a user device based on the first display area configuration in response to a first user request;
flagging a resource not currently included in the first display area configuration;
logging the number of times the user accesses the resource;
adding the resource to the first display area configuration when the number of times the user accesses the resource reaches a predefined threshold;
updating the first profile based on the resource added to the first display area configuration;
logging a period of time the user does not access the resource on the first display area configuration;
removing the resource from the first display area configuration when the period of time reaches a predetermined threshold;
detecting a click of a control key and a function key of a keyboard;
switching, from the first profile, to the second profile in response to the detection; and
building a second display area on the user device based on the second display area configuration in response to the switch.

2. The method of claim 1, wherein the display area is a computer desktop.

3. The method of claim 1, further comprising:
determining whether a selected resource is not currently included in a separate profile; and
notifying the user that the selected resource cannot be added to the display area configuration.

4. The method of claim 1, further comprises linking the profile to at least one calendar event.

5. The method of claim 4, wherein the building occurs in response to an occurrence of the at least one calendar event.

6. The method of claim 1, wherein a service solution provider provides a computer infrastructure that performs the method for one or more consumers.

7. A system for defining a display area configuration of a user device, comprising:
a bus;
a processor coupled to the bus; and
a memory medium coupled to the bus, the memory medium comprising instructions to:
assign a user a plurality of roles, wherein the user is only able to access one of the plurality of roles at a time;
associate a first set of resources, from a plurality of available resources, with a first role of the plurality of roles for inclusion in a first display area configuration;
associate a second set of resources from a plurality of available resources, with the second role of the plurality of roles for inclusion in a second display area configuration;
build a first profile from the first set of resources;
build a second profile from the second set of resources, wherein the second profile is in a same application as the first profile;
save the first profile and the second profile;
build a first display area on a user device based on the first display area configuration in response to a first user request;
flag a resource not currently included in the first display area configuration;
log the number of times the user accesses the resource;
add the resource to the first display area configuration when the number of times the user accesses the resource reaches a predefined threshold;
update the first profile based on the resource added to the first display area configuration;
log a period of time the user does not access the resource on the first display area configuration;
remove the resource from the first display area configuration when the period of time reaches a predetermined threshold;
detect a click of a control key and a function key of a keyboard;
switch, from the first profile, to the second profile in response to the detection; and
build a second display area on the user device based on the second display area configuration in response to the switch.

8. The system of claim 7, wherein the display area is a computer desktop.

9. The system of claim 7, the memory medium further comprising instructions to:
determine whether a selected resource is not currently included in a separate profile; and
notify the user that the selected resource cannot be added to the display area configuration.

10. The system of claim 7, the memory medium further comprising instructions to:
link the profile to at least one calendar event; and
wherein the building occurs in response to an occurrence of the at least one calendar event.

11. A computer program product for defining a display area configuration of a user device, the computer program product comprising a computer readable hardware storage device, wherein the computer readable hardware storage device excludes a signal per se, and wherein the computer program product comprises program instructions stored on the computer readable hardware storage device, to:
assign a user a plurality of roles, wherein the user is only able to access one of the plurality of roles at a time;
associate a first set of resources, from a plurality of available resources, with a first role of the plurality of roles for inclusion in a first display area configuration;
associate a second set of resources from a plurality of available resources, with the second role of the plurality of roles for inclusion in a second display area configuration;
build a first profile from the first set of resources;
build a second profile from the second set of resources, wherein the second profile is in a same application as the first profile;
save the first profile and the second profile;
build a first display area on a user device based on the first display area configuration in response to a first user request;
flag a resource not currently included in the first display area configuration;
log the number of times the user accesses the resource;
add the resource to the first display area configuration when the number of times the user accesses the resource reaches a predefined threshold;
update the first profile based on the resource added to the first display area configuration;
log a period of time the user does not access the resource on the first display area configuration;

remove the resource from the first display area configuration when the period of time reaches a predetermined threshold;

detect a click of a control key and a function key of a keyboard;

switch, from the first profile, to the second profile in response to the detection; and build a second display area on the user device based on the second display area configuration in response to the switch.

12. The computer program product of claim 11, wherein the display area is a computer desktop.

13. The computer program product of claim 11, further comprising program instructions stored on the computer readable hardware storage device to:

determine whether a selected resource is not currently included in a separate profile; and notify the user that the selected resource cannot be added to the display area configuration.

14. The computer program product of claim 11, further comprising program instructions stored on the computer readable hardware storage device to:

link the profile to at least one calendar event; and
wherein the building occurs in response to an occurrence of the at least one calendar event.

\* \* \* \* \*